Sept. 22, 1959     T. M. HERBERT     2,904,961
MULTI-FLUID BRAKE OPERATING MOTOR
Filed Sept. 23, 1957                               2 Sheets-Sheet 1

INVENTOR
Thomas M. Herbert
BY Wm R. Glisson
ATTORNEY

INVENTOR
Thomas M. Herbert
BY
Wm. R. Glisson
ATTORNEY

United States Patent Office 2,904,961
Patented Sept. 22, 1959

2,904,961
MULTI-FLUID BRAKE OPERATING MOTOR

Thomas M. Herbert, Huntingdon Valley, Pa., assignor to The Budd Company, Philadelphia, Pa., a corporation of Pennsylvania Application September 23, 1957, Serial No. 685,663

6 Claims. (Cl. 60—97)

This invention relates to a multi-fluid brake operating motor and has for an object the provision of improvements in this art.

Brakes of railway vehicles normally are operated by two different means, one the usual automatic means through the pressure air system and the other an emergency and holding means through mechanical linkages, cables and the like known as the hand brake system.

The invention is particularly concerned with disk brake operation and a representative system of this kind is shown, for example, in U.S. Patent No. 2,447,244.

In this system a motor in the form of a cylinder-piston device normally operates the brakes and the linkage-cable gear serves for hand operation. According to the present invention the motor is altered and empowered in such manner that the single unit will act both for automatic operation and for hand operation. This is accomplished by providing a piston-in-piston arrangement wherein the normal operation is unaltered and wherein the secondary or hand operation is accomplished by admitting fluid to the other end of the altered motor unit. The secondary actuation is carried out without affecting the primary operating means. The motor unit is arranged between the brake operating levers or tongs in the same manner as if the secondary operating means had not been imposed.

The invention will better be understood from the following description of an exemplary embodiment, reference being made to the accompanying drawings thereof, wherein.

Figure 1:
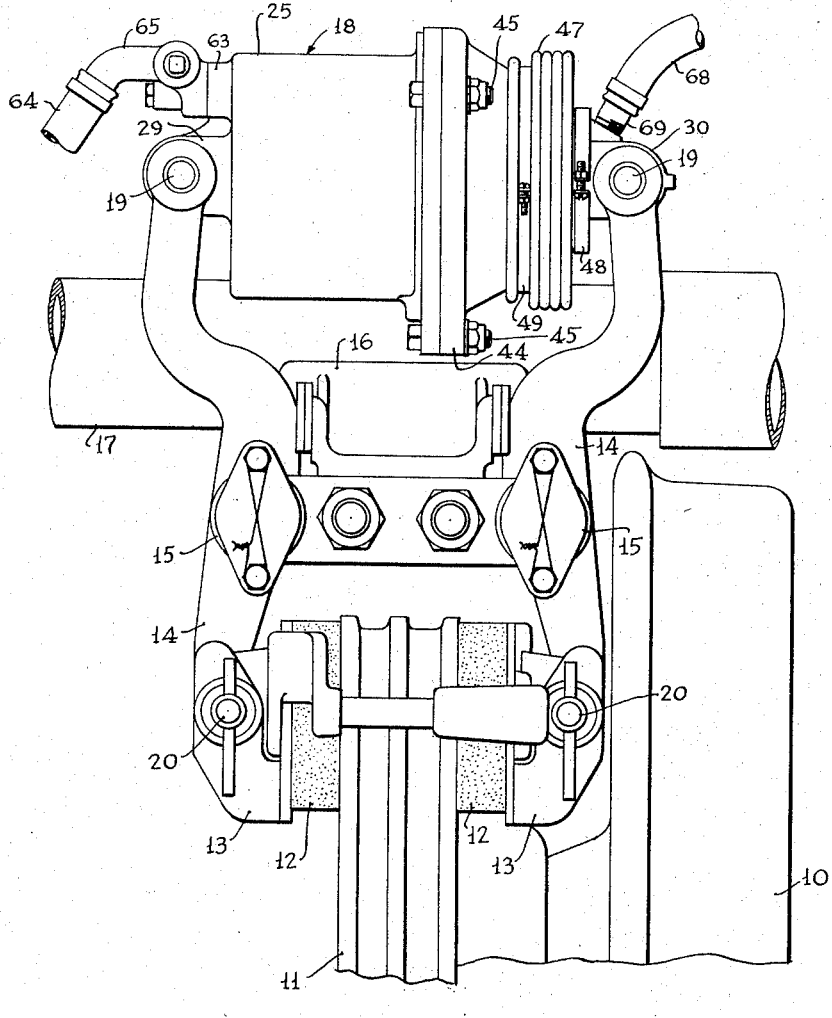
Fig. 1 is a top plan view of apparatus embodying the invention.

The general arrangement, as shown in Fig. 1 includes a truck wheel-axle unit, of which the wheel 10 is shown, a brake disk 11 fast on the axle, non-metallic composition brake shoe lining pads 12 for acting against the disk, brake shoes 13 carrying the lining, brake operating levers or tongs 14 pivoted at 15 on a mount 16 carried by a brake beam 17 and a brake operating motor 18 secured at its ends by pivot pins 19 to the outer ends of the levers or tongs 14. The brake shoes 13 are connected to the levers or tongs 14 by pivot pins 20.

Figure 2:
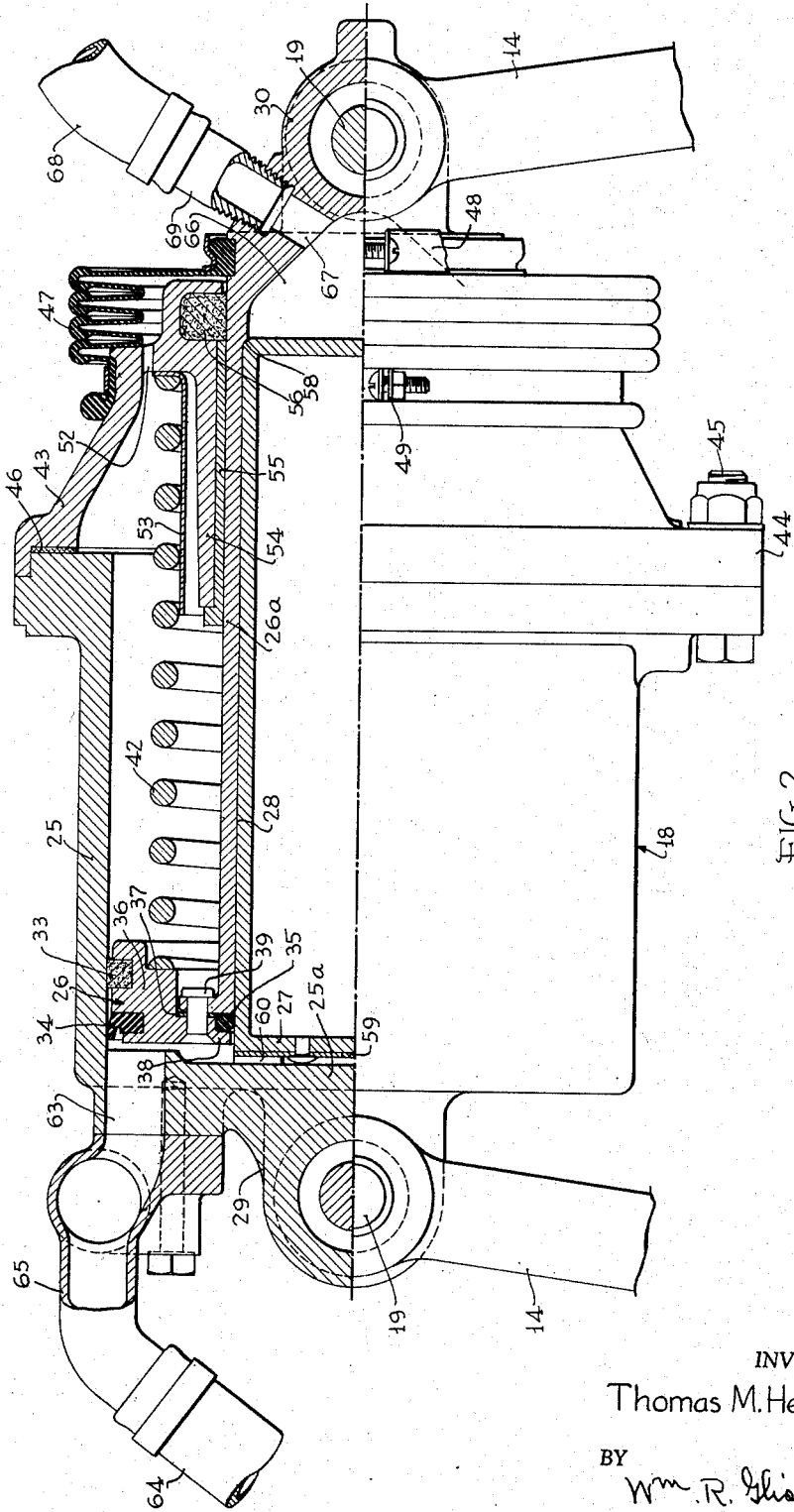
Fig. 2 is an enlarged partial plan view and axial section of the brake operating motor alone.

It is the motor unit 18 with which the present invention is particularly concerned. This is shown in Fig. 2.

The motor unit 18 includes a cylinder 25 having a piston chamber therein and a head at one end, a first, outer, main, or primary piston 26 therein having a piston chamber therein and a head at one end, and a second, inner, or secondary piston 27 operatively mounted within a bore 28 of the main piston 26. The cylinder 25 has an end projection or lug 29 which carries one of the pivot pins 19 for one of the brake levers 14 and the main piston 26 has an end projection or lug 30 which carries the other pivot pin 19 for the other brake lever 14. The main piston 26 may be characterized as a piston-cylinder since it partakes of the character of each.

Packing rings 33 and 34 are provided on the primary piston 26 and a packing ring 35 is provided interiorly of the annular head of the main piston 26 to cooperate with the inner piston 27. This places all of the packing at one end of the assembly and by removing the head 36 provided on the outer piston 26 all packing can be replaced. A sealing ring 37 is shown between the head 36 and a flange 38 of the outer piston, fasteners 39 in the form of rivets, bolts, welding, or the like being used to secure the head on the piston.

A spring 42 urges the piston 26 into the cylinder 25, the spring at its outer end acting against a guide cap 43 secured to a flange 44 of the cylinder, as by bolts 45. Packing 46 may be secured at the joint to prevent leakage. A bellows 47 is provided to seal the space between the guide cap 43 and the outer end of the inner piston 27, clamps 48 and 49 holding it in place.

Air passages 52 are provided in the guide cap 43 to allow breathing between the enclosed spaces on each side of the cap. A seat ring 53 holds the spring in position, this ring surrounding an annular cylindrical interior guide projection 54 of the cylinder guide cap 43. An annular wear lining sleeve 55 guides the piston 26 and packing 56 is provided in a groove in the guide cap to exclude dirt and to oil the piston sleeve.

The inner piston 27 is free-floating in that it has no external connections. It is closed at both ends. One end, which may be called the tail end because it is the end at which the outer piston 26 projects from the outer cylinder 25, engages an annular shoulder 58 in the sleeve portion 26a of the outer piston 26; the other end carries a plate 59 to which are secured a number of buffer pads 60 adapted to engage the inner surface of the head 25a of the outer cylinder.

Fluid, normally air under pressure, is admitted to the head end of cylinder 25 through a channel or port 63, a flexible hose 64 being connected to a nipple 65 which projects from the head.

Fluid, normally liquid under pressure, is admitted to the space 66 between the piston 26 and the piston 27 through a channel or port 67, a flexible hose 68 being connected to a nipple 69 which projects from the head.

In normal operation air is admitted through port 63 into the cylinder 25 and forces piston 26 outward. It also forces the inner piston 27 outward along with the piston 26, air having access to the end of the inner piston 27 through spaces between the buffer pads 60. Since the other end of the inner piston 27 engages a fixed stop at the shoulder 58 of the outer piston it assists in moving the outer piston. In other words, the outer piston 26 and the inner piston 27 act like a single piston. When fluid is exhausted through the port 63 the spring 42 forces the outer piston to return, carrying the inner piston with it. The engagement of the buffer pads 60 with the head end of the cylinder 25 and the engagement of the piston 27 with the stop shoulder 58 of the outer piston keeps the end of the outer piston spaced at a distance from the cylinder head.

For emergency or hand operation liquid is admitted through the port 67 into the space 66 and forces the outer piston 26 outward. In this case the inner piston 27 does not move but remains in abutting relationship through its buffer pads 60 with the head of the cylinder 25. When fluid is exhausted through the port 67 the spring 42 forces the piston 26 to return.

It is thus seen that the invention provides simple, convenient and inexpensive apparatus for selectively operating the brakes by either one fluid, such as air, or for operating them by another fluid, such as oil or other hydraulic medium, all without complex levers, cables or other gear.

While one embodiment of the invention has been described for purposes of illustration, it is to be understood

What is claimed is:

1. Brake operating apparatus comprising in combination, an outer cylinder having a chamber head end and power connection, a piston-cylinder having an inner cylinder chamber with a chamber head at one end and an annular piston head at the other end operatively fitting in said outer cylinder, said piston-cylinder chamber head having a power connection at the end opposite the outer cylinder head power connection, an inner piston operatively mounted in the cylinder chamber of said piston-cylinder and having one end disposed toward each of said cylinder chamber heads, and means for selectively controlling fluid flow into the chambers at each of said chamber heads whereby to move the outer cylinder alone relative said piston-cylinder and inner piston or to move the piston-cylinder alone relative to said outer cylinder and said inner piston.

2. Apparatus as set forth in claim 1, further characterized by the fact that said inner piston is provided with buffer pads on one end.

3. Apparatus as set forth in claim 1, further characterized by the fact that said inner piston has heads on both ends and buffer pads on one end.

4. Apparatus as set forth in claim 1, further characterized by the fact that said inner piston is free floating between the two cylinder heads and is provided with circumferentially spaced buffer pads to engage the outer cylinder chamber head while admitting fluid between said outer cylinder chamber head and the end of the inner piston.

5. Apparatus as set forth in claim 1, further characterized by the fact that the annular piston head of the piston-cylinder comprises a separate annular member which retains packing rings for sealing both cylinder chambers.

6. Brake operating apparatus comprising in combination, an outer cylinder having a piston chamber therein and a head at one end, a piston-cylinder operatively mounted in the chamber of said cylinder, said piston-cylinder having a piston chamber therein and a head at one end, opposite the head end of the cylinder, an inner piston operatively mounted in the chamber of said piston-cylinder, said inner piston having a head at one end engageable with the piston-cylinder at its head end and at the other end engageable with the head of the cylinder, a fluid flow passage in the head of the cylinder for fluid from one source, a fluid flow passage in the head of the piston-cylinder for fluid from another source, and operating connections at the head of the cylinder and at the head of the piston-cylinder.

References Cited in the file of this patent
UNITED STATES PATENTS

| | | |
|---|---|---|
| 1,558,374 | Lengel | Oct. 20, 1925 |
| 2,649,169 | Holman | Aug. 18, 1953 |
| 2,726,738 | Fawick | Dec. 13, 1955 |